United States Patent [19]
Kuepper

[11] Patent Number: 5,335,445
[45] Date of Patent: Aug. 9, 1994

[54] MOVING LIGHT INSECT TRAP

[76] Inventor: Theodore A. Kuepper, 4907 Marlin Way, Oxnard, Calif. 93035

[21] Appl. No.: 112,137
[22] Filed: Aug. 26, 1993
[51] Int. Cl.⁵ .............................................. A01M 1/04
[52] U.S. Cl. ......................................... 43/114; 43/113
[58] Field of Search ......................... 43/113, 114, 107

[56] References Cited

U.S. PATENT DOCUMENTS

| | | | |
|---|---|---|---|
| 2,305,898 | 12/1942 | Richter et al. | 43/113 |
| 3,023,539 | 3/1962 | Emerson, Jr. | 43/114 |
| 3,108,391 | 10/1963 | Sipos | 43/113 |
| 3,123,933 | 3/1964 | Roche | 43/113 |
| 3,950,886 | 4/1976 | Newhall et al. | 43/113 |
| 4,654,998 | 4/1987 | Clay | 43/113 |
| 5,231,790 | 8/1993 | Dryden et al. | 43/113 |
| 5,255,468 | 10/1993 | Cheshire, Jr. | 43/114 |

Primary Examiner—P. Austin Bradley
Assistant Examiner—Chuck Y. Mah
Attorney, Agent, or Firm—Robert M. Sperry

[57] ABSTRACT

An improved insect trap having a plurality of "moving" or sequentially-activated lights to attract insects, with particular emphasis on attracting and trapping parasitic insects, such as fleas, together with a card coated with a sticky substance to capture and retain the insects.

14 Claims, 3 Drawing Sheets

MOVING LIGHT INSECT TRAP

BACKGROUND

FIELD OF INVENTION

This invention relates to insect traps and is particularly directed to improved insect traps having "moving" or sequentially-activated lights to attract insects, with particular emphasis on attracting and trapping parasitic insects, such as fleas.

PRIOR ART

Insect traps have long used electrical and electronic means to attract and kill insects. In particular, electrical insect traps designed to attract and trap fleas have recently been developed. However, many of the prior art electrical insect traps have been complex and expensive to produce and purchase. Virtually all of the prior art electrical insect traps have used a single, non-moving light in order to attract insects.

In regards to previously patented flea traps, all of the single light designs have been tested and compared with the moving or sequentially-activated light (S-A-L) design. Testing has confirmed that the S-A-L design consistently attracts fleas better than a stationary light. In fact, the S-A-L design has been shown to attract fleas even in the presence of a potential host, such as a dog or cat. This is something that stationary light designs have never been able to accomplish.

A theory as to why the S-A-L design is more effective than a stationary light flea trap is as follows: it has been observed in laboratory tests that fleas can differentiate between light and dark and can see movement. Sequencing lights create the illusion of movement by forming an ever-changing pattern of light and shadow areas. Thus, fleas are more attracted to a "moving" light source than a stationary one. Likewise, other parasitic insects, such as mosquitoes are also attracted to movement. In fact, any insect that is preferentially attracted to movement will be attracted to the S-A-L design, compared to a stationary light source. A search in the United States Patent Office has revealed the following:

| U.S. PAT. NO. | INVENTOR | ISSUED |
| --- | --- | --- |
| 4,979,329 | Olive et al | Dec. 1990 |
| 4,918,856 | Olive et al | Apr. 1990 |
| 4,700,506 | Williams | Oct. 1987 |
| 4,686,789 | Williams | Aug. 1987 |
| 4,566,220 | Justice | Jan. 1986 |
| 4,212,129 | Shumate | Jul. 1980 |
| 4,366,643 | Boaz | Jan. 1983 |
| 4,157,629 | Parks | Jun. 1979 |
| 4,117,624 | Phillips | Oct. 1978 |
| 4,086,721 | Deas | May 1978 |
| 3,513,585 | Ross | May 1970 |
| 3,465,468 | Takamooto | Sep. 1969 |
| 2,384,930 | Kendrick | Sep. 1945 |
| 1,820,813 | Loomis | Aug. 1931 |
| 1,019,410 | Baker | Mar. 1912 |

Each of these references uses a stationary light source. Thus, none of the prior art insect traps have been entirely satisfactory.

BRIEF SUMMARY AND OBJECTS OF INVENTION

The disadvantages of prior art insect traps are overcome with the present invention and an improved insect trap is provided which uses a moving or sequentially-activated light source and is simple and inexpensive to produce and operate and which requires a minimal amount of electricity to operate, yet which is highly effective in attracting and trapping insects.

The advantages of the present invention are preferably attained by providing an improved insect trap having a plurality of "moving" or sequentially-activated lights to attract insects, together with a card coated with a sticky substance to capture and retain the insects.

Accordingly, it is an object of the present invention to provide an improved insect trap.

Another object of the present invention is to provide an insect trap having improved electrical means for attracting insects.

An additional object of the present invention is to provide an improved insect trap which is simple and inexpensive to produce, purchase and operate.

A further object of the present invention is to provide an improved insect trap having electrical means for attracting insects yet which requires a minimal amount of electricity to operate.

Another object of the present invention is to provide an improved insect trap which is simple and inexpensive to produce and operate and which requires a minimal amount of electricity to operate, yet which is highly effective in attracting and killing insects.

A specific object of the present invention is to provide an improved insect trap having a plurality of "moving" or sequentially-activated lights to attract insects, together with a card coated with a sticky substance to capture and retain the insects.

These and other objects and features of the present invention will be apparent from the following detailed description, taken with reference to the figures of the accompanying drawings.

DETAILED DESCRIPTION OF THE INVENTION

Figure 1:
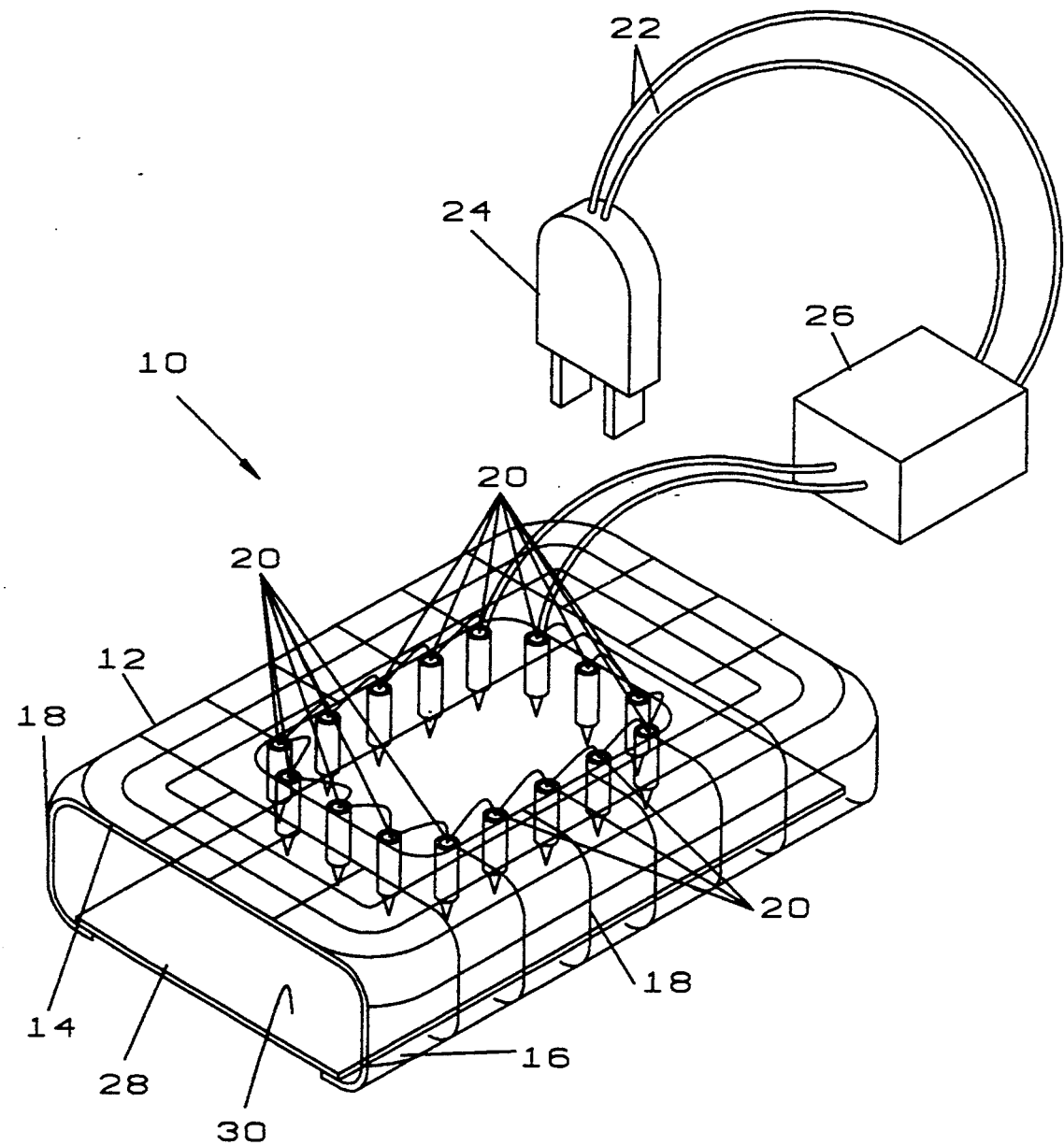
FIG. 1 is an isometric view of an insect trap embodying the present invention.

In that form of the present invention chosen for purposes of illustration, FIG. 1 shows an insect trap, indicated generally at 10 having a framework 12 formed of open-mesh material, such as wire, plastic or the like, having an upper surface 14 and a lower surface 16 joined by side members 18. Mounted within the framework 12 is a string of electric lights 20 which receive electrical power through suitable wires 22 and connector plug 24, which connects to a conventional electrical outlet, not shown. Between the connector plug 24 and the lights 20 is a control box 26 which serves to activate the lights 20 sequentially or randomly, so as to simulate the appearance of motion of the lights 20. Finally, suitable means is provided for trapping or killing the insects, such as card 28, having a sticky upper surface 30, is inserted into the framework 12 with the sticky side 30 facing upward. Obviously, if desired, suitable electrodes could be substituted for the card 28 to electrocute insects coming in contact therewith.

In use, when the connector plug 24 is connected to a conventional electrical outlet, not shown, the control box 26 serves to activate the lights 20 sequentially or randomly to simulate the appearance that the lights 20 are moving. It is well known that many insects are attracted to light. However, because the lights are "moving" they suggest to parasitic insects, such as fleas, that the lights 20 are alive and, hence, are a potential meal. This greatly enhances the attraction of the lights and causes the insects to move toward the lights 20. When the insects enter the framework 12, they soon encounter the sticky surface 30 of the card 28 and find themselves trapped by the sticky surface 30, as is true with fly paper and the like. When the number of insects caught by the sticky surface 30 becomes unsightly, or the card 28 becomes full, the user simply removes the card 28 from the framework 12 and replaces it with a new card 28. The lights 20 are preferably very small, such as the lights used in Christmas decorations, those commonly called "rope" lights, and the like, and use very little electricity. Consequently, the insect trap 10 can be operated at minimal expense, yet because of the "moving" lights, the insect trap 10 is highly effective.

Figure 2:
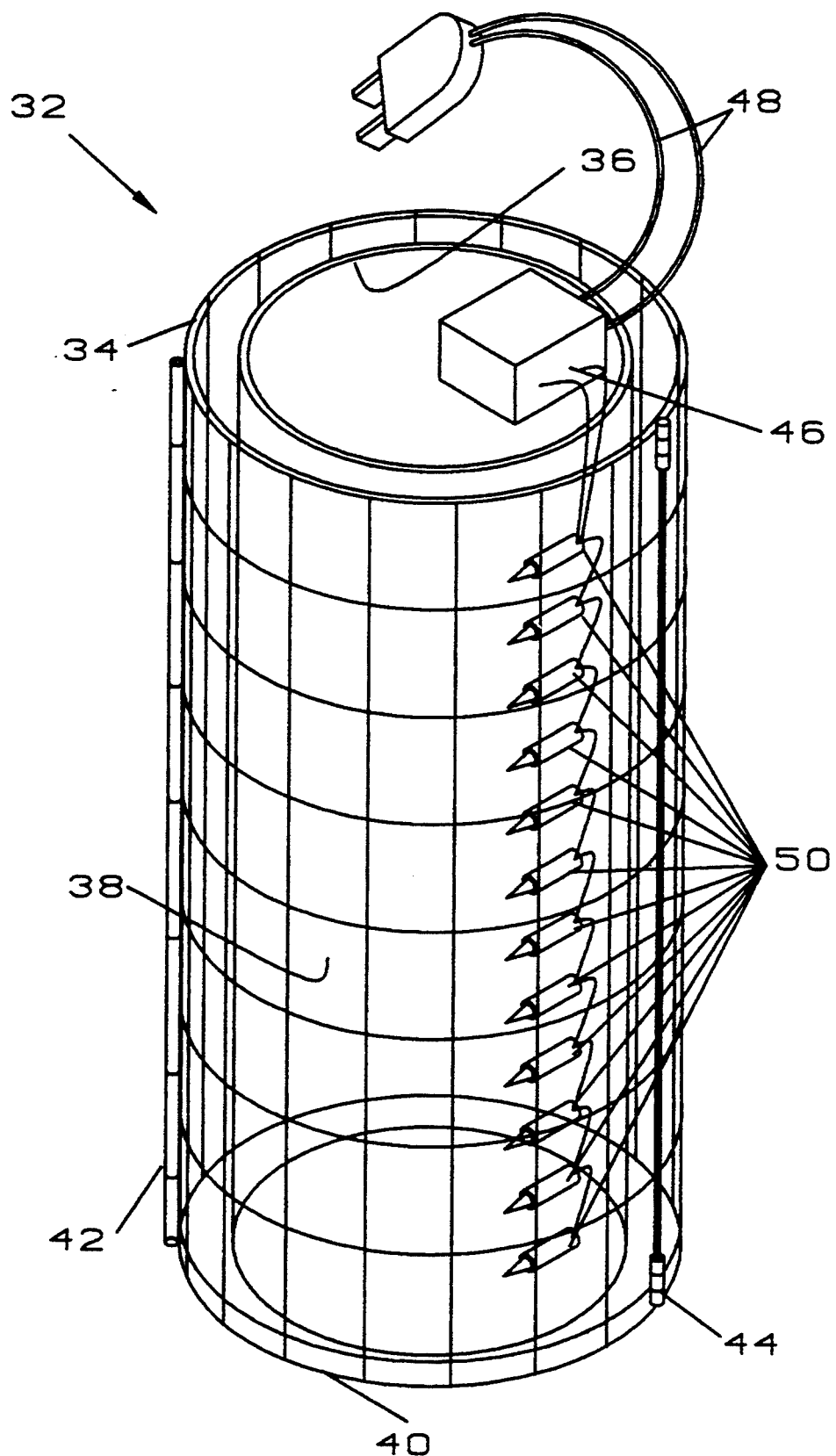
FIG. 2 is a view, similar to that of FIG. 1, showing an alternative form of the insect trap of FIG. 1.

FIG. 2 shows an alternative form of the insect trap 10 of FIG. 1, indicated generally at 32, and comprising an outer cylinder 34 of open-mesh material, such as wire or plastic, having an inner cylinder 36 of translucent or transparent material, such as paper or plastic, having an exterior surface 38 covered with sticky material, such as that on the upper surface 30 of card 28 of the insect trap 10 of FIG. 1. The inner cylinder 36 is removably positioned within the outer cylinder 34 and is releasably retained within the outer cylinder 34 by suitable means such as door 40, which is hingedly attached to the outer cylinder 34 on one side, as seen at 42, and has a releasable latch 44 located at the opposite side. A control box 46 is mounted within the outer cylinder 34, adjacent the end opposite door 40, and has an electrical connector 48 for connection to a standard electrical outlet, not shown. Finally, a string of lights 50 extends axially within the outer cylinder 34 and is coaxial with both the outer cylinder 34 and inner cylinder 36 and the control box 46 serves to activate the lights 50 sequentially or randomly to create a "moving" effect.

In use, the control box 46 actuates the lights 50 sequentially or randomly to simulate motion, which attracts insects to the insect trap 32. However, as the insects attempt to move to the lights 50, they will pass through the open-mesh material of the outer cylinder 34 and will encounter the sticky outer surface 38 of the inner cylinder 36, where the insects will become trapped. The latch 44 serves to releasably secure the door 40 in its closed position, extending across the bottom of the outer cylinder 34, to retain the inner cylinder 36 within the outer cylinder 34. However, when the number of insects trapped on surface 38 of the inner cylinder 36 becomes unsightly, latch 44 can be released to allow the door 40 to be opened to permit removal and replacement of the inner cylinder 36. Alternately, the lights 50 could be positioned outside of inner cylinder 36, in the annulus formed by inner cylinder 36 and outer cylinder 34.

Figure 3:
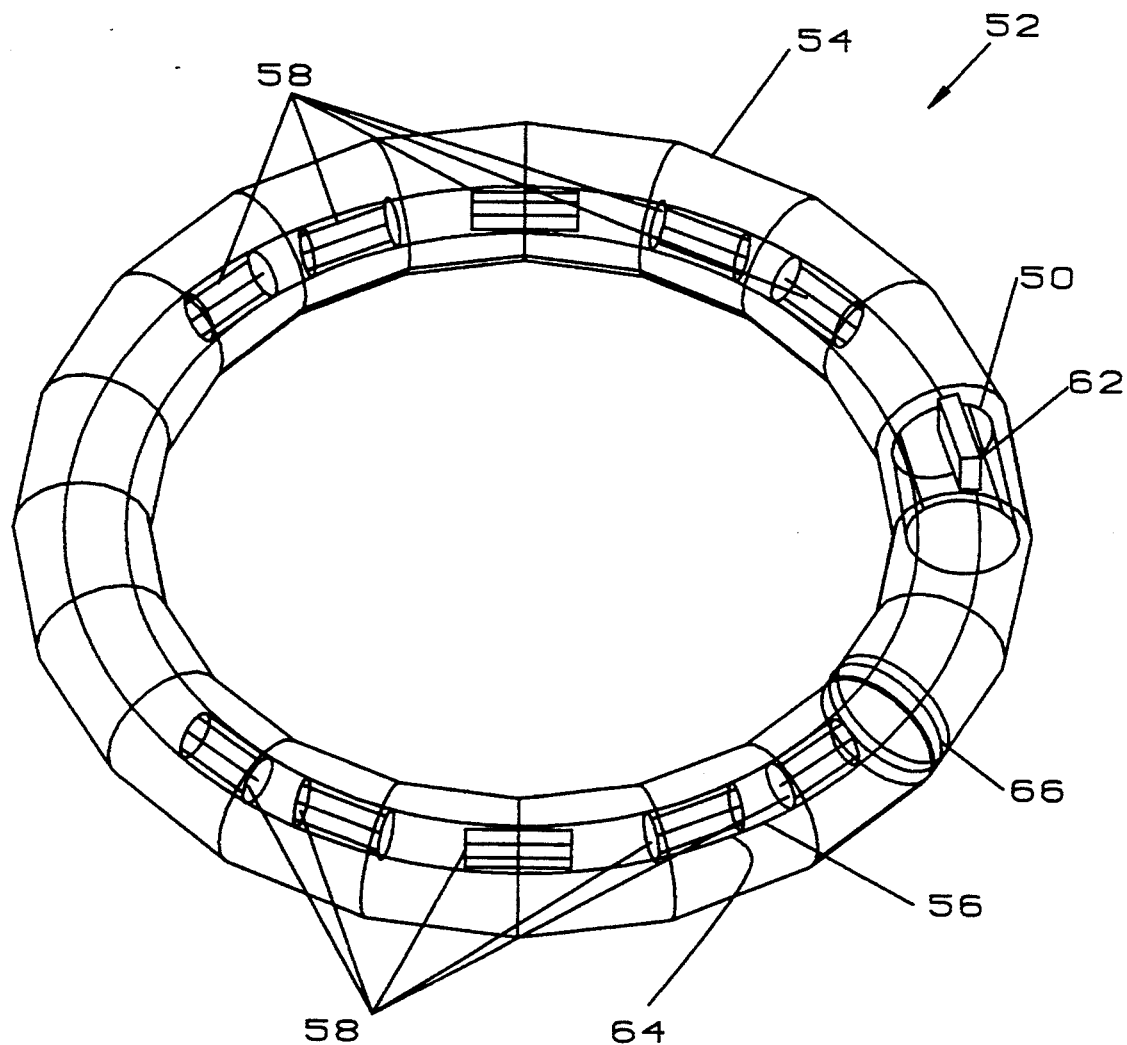
FIG. 3 is a view, similar to that of FIG. 1, showing another alternative form of the insect trap of FIG. 1.

FIG. 3 shows an alternative form of the insect trap 10 of FIG. 1, indicated generally at 52, for use as a collar for dogs, cats and the like. The insect trap 52 comprises a first annulus 54 formed of a suitable open-mesh material, such as wire, plastic or the like, containing a second annulus 56 formed of transparent or translucent material and a string of lights 58 is contained within the second annulus 56 and is powered by batteries contained within a suitable control box 60, which also has a suitable "ON-OFF" switch 62 and serves to actuate the lights 58 sequentially or randomly. The outer surface 64 of the second annulus 56 is covered with sticky material, such as that on the upper surface 30 of card 28 of the insect trap 10 of FIG. 1. Finally a suitable latch 66, which may be formed of hook-and-loop material, is provided on the first annulus 54 to allow adjustment of the size of the insect trap 52 to accommodate different sizes of pets and to allow removal and replacement of the second annulus 56 when necessary or desirable. The second annulus 56 is removed and replaced through the open end of the first annulus 54. Therefore, the lights 58 have a "pull apart" feature that allows them to be disconnected so the second annulus 56 can be slipped over them for insertion and removal.

In use, latch 66 of the first annulus 54 is opened and the length of the first annulus is trimmed to enable the insect trap 52 to fit comfortably about the neck of a pet, not shown. Next, the second annulus 56 is trimmed to fit within the first annulus 54 and is inserted into the end of the first annulus 54. Also, the lights 58 are disconnected so the second annulus 56 can slip over them to enclose the lights 58 and control box 60. Thereafter, latch 66 is closed to retain the second annulus 56 within the first annulus 54 and the "ON-OFF" switch 62 of control box 60 is turned "ON" to actuate the lights 58 sequentially or randomly and, hence, to produce the effect of motion of the lights 58. The insects attracted by the "moving" lights 58, will pass through the mesh material of the first annulus 54 and will be trapped by the sticky surface 64 of the second annulus 56. When necessary or desirable, latch 66 can be reopened to allow removal and replacement of the second annulus 56. In particular, it is noted that sequentially-activated lights can also attract flying insects, such as mosquitoes, outdoors at night. In this application, a sticky card, such as that shown as inner cylinder 36 in FIG. 2, can be used to trap insects, or an electrical field, as used in a conventional outdoor "bug-zapper" device, can be used to kill insects. In either case, sequentially-activated lights can be used to attract flying insects.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. An insect trap comprising:
a framework formed of open-mesh material,
a plurality of lights located within said framework,
means for respectively actuating said lights in a manner to simulate motion, and
means located adjacent said lights for trapping insects.

2. The insect trap of claim 1 wherein:
said means for actuating said lights actuates the lights sequentially.

3. The insect trap of claim 1 wherein:
said means for actuating said lights actuates the lights randomly.

4. The insect trap of claim 1 wherein:
said means for trapping, said insects has a sticky coating.

5. The insect trap of claim 1 wherein:
said means for trapping insects is a card having a sticky surface positionable adjacent said lights.

6. The insect trap of claim 1 wherein:
said framework is a cylinder.

7. The insect trap of claim 6 wherein:
said means for trapping insects is a second cylinder positionable within said framework and having an outer surface covered with sticky material.

8. The insect trap of claim 6 wherein:
said means for trapping insects is transparent.

9. The insect trap of claim 6 wherein:
said means for trapping insects is translucent.

10. The insect trap of claim 1 wherein:
said means for actuating said lights includes a plug connectable to a standard electrical outlet.

11. The insect trap of claim 1 wherein:
said means for actuating said lights is battery powered.

12. The insect trap of claim 1 wherein:
said framework is a first annulus,
said means for trapping insects is a second annulus having a sticky outer surface and removably insertable within said first annulus, and
said lights and said means for actuating said lights are locatable within said second annulus.

13. The insect trap of claim 12 wherein:
said first annulus has latch means for opening and closing said first annulus to allow removal and replacement of said second annulus.

14. The insect trap of claim 1 wherein:
said means for trapping insects comprises electrical means for electrocuting insects on contact.

* * * * *